United States Patent [19]

Liu

[11] Patent Number: 5,301,088
[45] Date of Patent: Apr. 5, 1994

[54] DOVETAIL FASTENING STRUCTURE FOR A DISK DRIVE

[75] Inventor: Morgan C. Liu, Taoyuan, Taiwan

[73] Assignee: Enlight Corporation, Taoyuan, Taiwan

[21] Appl. No.: 22,362

[22] Filed: Feb. 25, 1993

[51] Int. Cl.⁵ .................. H05K 7/14; G06F 1/16; G12B 9/00
[52] U.S. Cl. ................... 361/685; 248/27.3; 292/DIG. 38
[58] Field of Search ............. 292/80, 87, DIG. 38; 312/333, 334.7; 248/27.3; 364/708.1; 360/137; 361/680–687, 724–727, 730–732, 754, 759, 798, 801

[56] References Cited

PUBLICATIONS

IBM Technical Disclosure Bulletin, vol. 33, No. 11, Apr., 1991, pp. 408–410, "Precision Low Profile Disconnect Device", copy in 439-152.

Primary Examiner—Leo P. Picard
Assistant Examiner—Michael W. Phillips
Attorney, Agent, or Firm—Ladas & Parry

[57] ABSTRACT

A fastening structure of a disk drive having a pair of dovetail seat plates is mounted to the lateral edges of the disk drive. Each end of the plate is dovetail shaped and the center region of the plate is extended upward to form a fastening plate having an inverse "L" shape. The end edge of the fastening plate is extended upward to form a press portion. The surface of the fastening plate is provided with a protruded strip. A disk drive securing support has two lateral sides for the mounting of disk drive. The inner wall of the lateral side has a dovetail groove of width corresponding to the dovetail seat plate. The lateral wall is provided with hole corresponding to the protruded strip. When mounting the disk drive, the dovetail seat plate is engaged into the dovetail groove of the disk drive securing support so as to cause the protruded strip to fasten with the hole, to complete the fastening of the disk drive. When the disk drive is to be disconnected, the fastening plate is pressed inward to cause the protruded strip to disengage from the hole so as to withdraw the disk drive.

4 Claims, 4 Drawing Sheets

DOVETAIL FASTENING STRUCTURE FOR A DISK DRIVE

BACKGROUND OF THE INVENTION

The present invention relates to a disk drive fastening structure, in particular, to a disk drive having a dovetail seat plate respectively mounted to each of the lateral sides of the disk drive Resilient fastening plate is provided on the dovetail seat plate. The structure provides a quick fastening of disk drive onto the disk drive securing support.

Conventionally, the parts of a personal computer (PC) are mounted within the computer case by many screws with various sizes. However, in view of the requirements for various functions, conventional PC faces a great problem. That is, the extension of memory capacity, the mounting of various parts for the specific function and the subsequent maintenance. In view of the mounting of disk drive, screws and nuts are used as fastening parts. In case maintenance of the PC is required, the screws and nuts have to be disconnected one by one. This is very inconvenient and laborious, and the disconnected screws and nuts may easily be misplaced. This will further deter the subsequent mounting of the disk drive.

SUMMARY OF THE INVENTION

As a result of the above drawbacks, it is the object of the present invention to provide a disk drive fastening structure. That is, a dovetail seat plate is mounted to the lateral side of the disk drive. This allows the dovetail seat plate to engage with the doevtail groove of the disk drive securing support. The dovetail seat plate is extended and mounted with a fastening plate and this allows the to be fastened into the hole of the disk drive securing support. This structure provides a quick mounting and disconnecting of disk drive onto or from the computer housing.

The other objects, advantages and features of the present invention will be more fully understood and appreciated by reference to the written specification and appended drawings

DETAILED DESCRIPTION OF THE INVENTION

Figure 1:
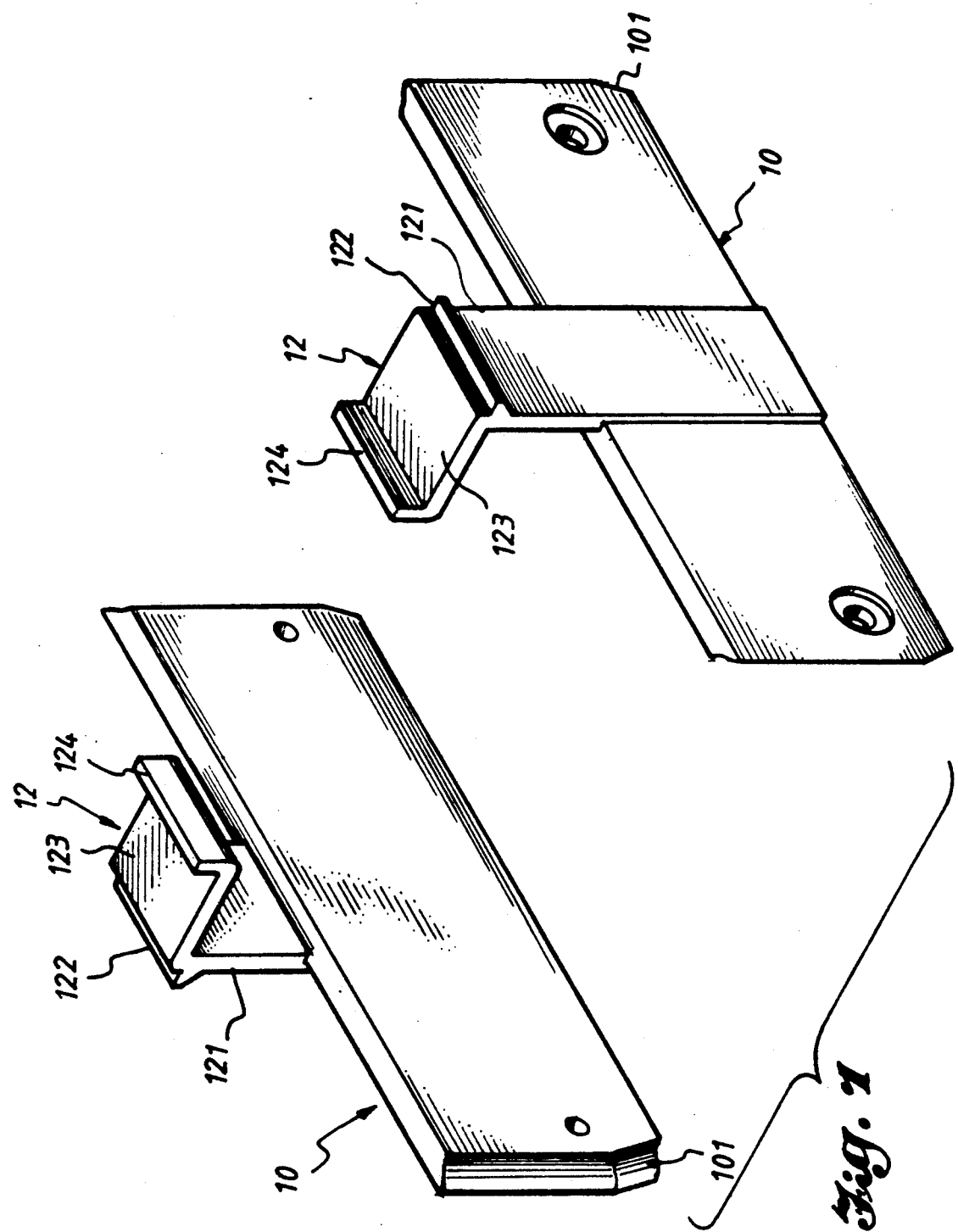
FIG. 1 shows a perspective view of a pair of dovetail seat plates of the present invention.

Referring to FIGS. 1 to 4, there is shown a disk drive fastening structure. At the lateral sides of the disk drive 20, each side is mounted with a dovetail seat plate 10 and this plate is mounted with any conventional method. The two ends of the dovetail seat plate 10 are dovetail shape and the bottom edge of the end forms an inverted angle 101. The center portion of the plate 10 is upward extended with an inverted L-shaped fastening plate 12. The fastening plate 12 is a resilient plate comprising a vertical portion 121 and a horizontal 123 portion, wherein the external wall of the vertical portion 121 is provided with a protruded strip 122, and the bottom edge of the protruded strip 122 has a slanting face. The end edge of the horizontal portion is extended upward to form a press portion 124. A disk drive securing support 22 is mounted to the computer (not shown) and the two lateral sides 221 of the support 22 are adaptable for the mounting of the disk drive 20. The inner wall of the lateral side 221 is provide with a dovetail groove 223 corresponding to the length of the dovetail seat plate 10. Holes 222 corresponding to the protruded strip 122 are provided to the lateral sides.

Figure 2:
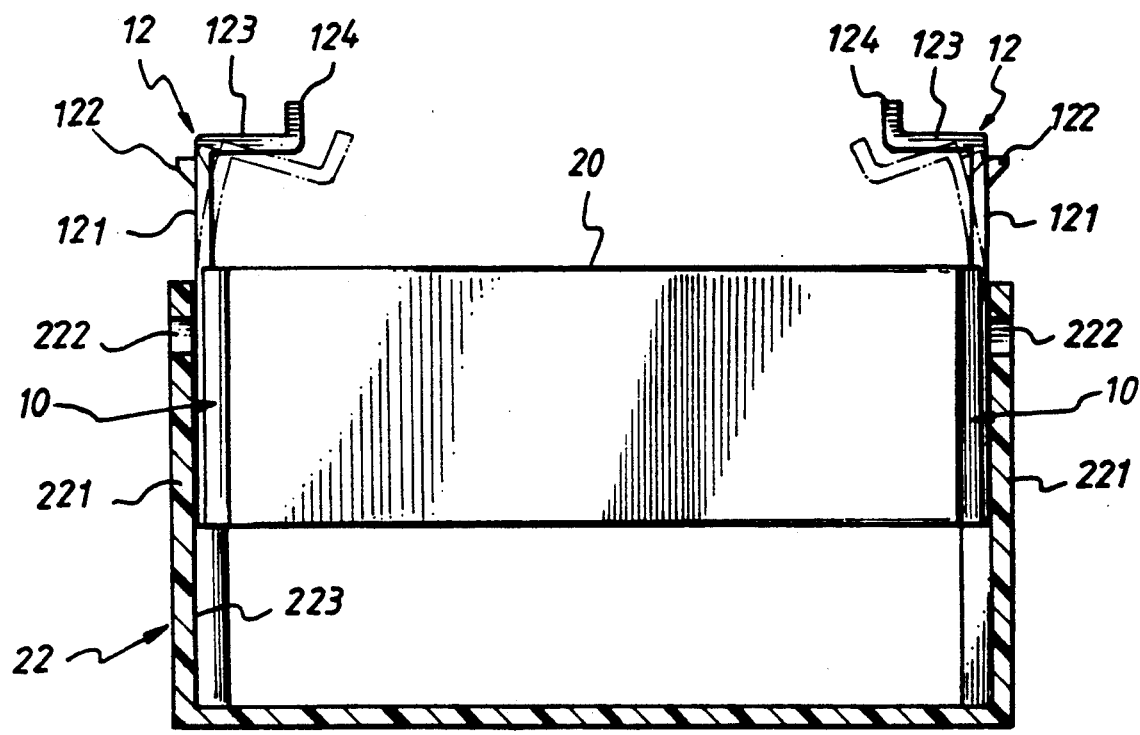
FIG. 2 is a sectional view showing the mounting of a disk drive onto the securing support in accordance with the present invention.
Figure 3:
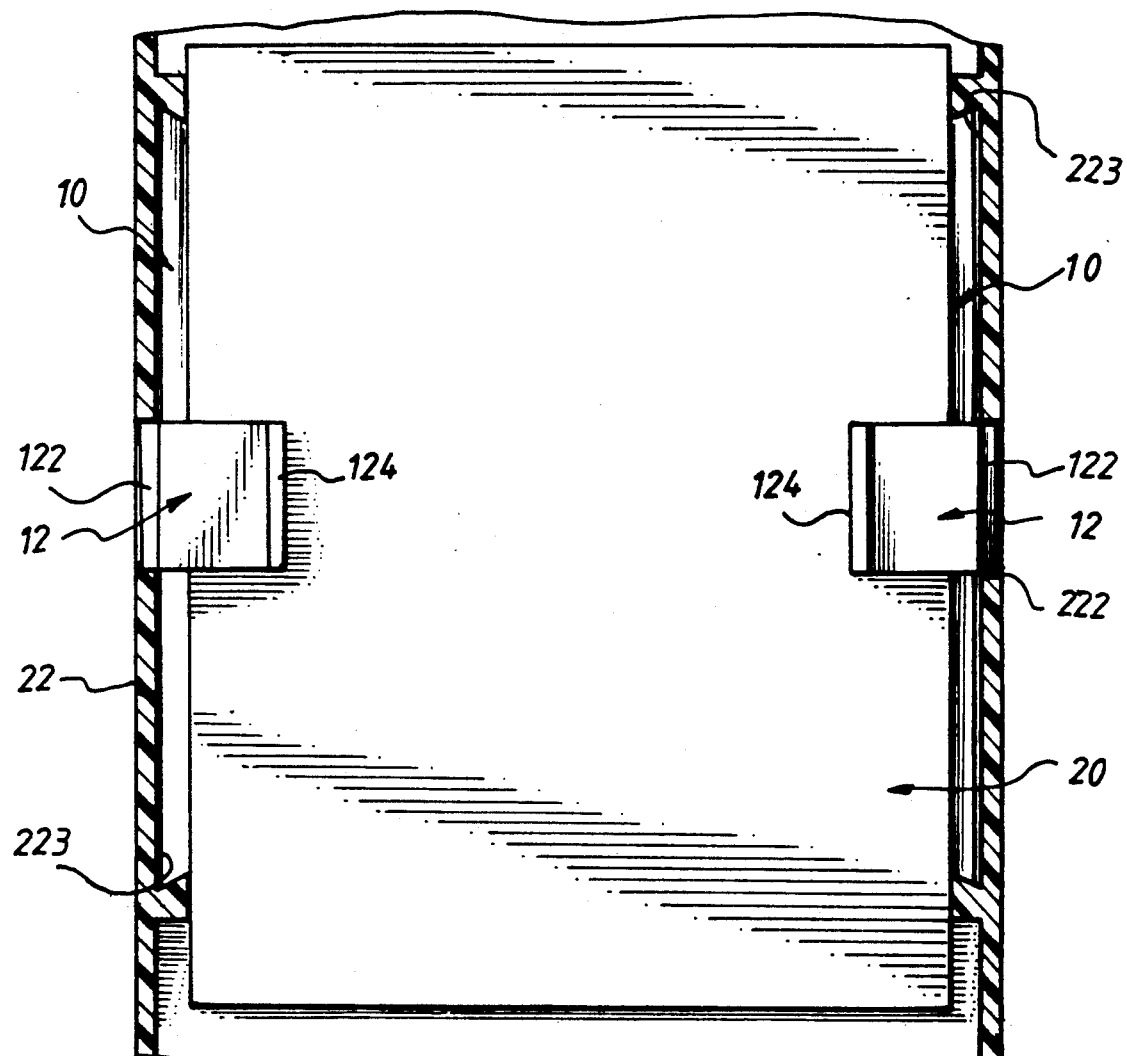
FIG. 3 is a top cross-sectional view showing the mounting of a disk drive onto the securing support in accordance with the present invention.
Figure 4:
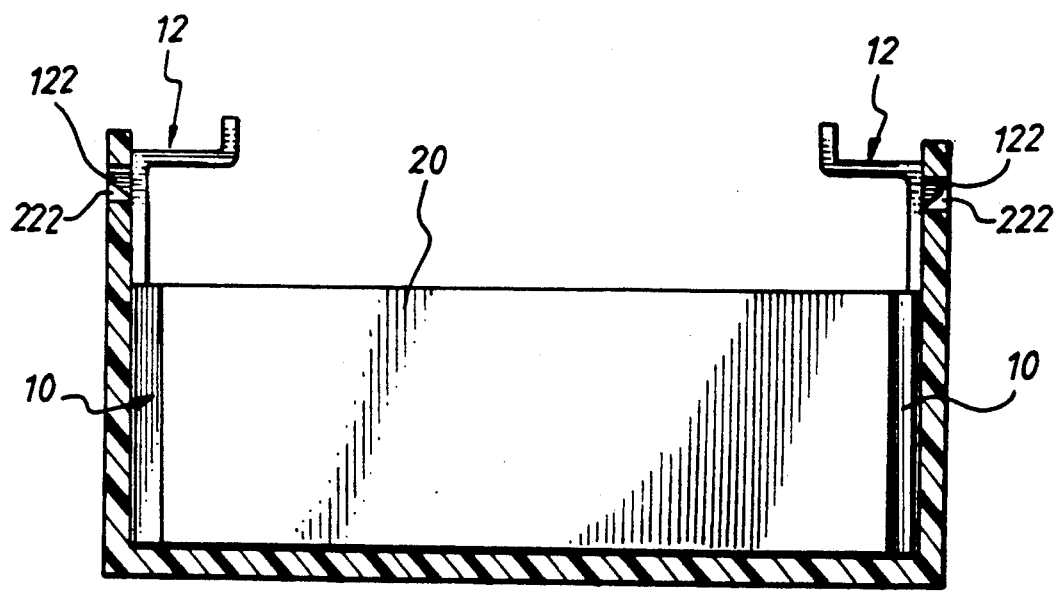
FIG. 4 is a front cross-sectional view showing the mounting of a disk drive onto the securing support in accordance with the present invention.

As shown in FIG. 2, when the disk drive 20 having being mounted with the dovetail seat plate 10 is to be installed, the two ends of the plate 10 must face directly to the dovetail groove 223 of the disk drive securing support 22 and the inverted angle 101 at the bottom edge of the plate 10 facilitates the guiding. The disk drive 20 is vertically inserted and the dovetail seat plate 10 is in engagement with the dovetail groove 223. During the process of mounting, the protruded strip 122 of the fastening plate 12 urges the top edge of the lateral side 221 but as a result of the slanting face at the bottom edge of the protruded strip 122, the fastening plate 12 will move inward, or the user has to press the press portion 124 to cause the plate 12 moves inward until the protruded strip 122 is in engagement with the hole 222 to complete the securing of the disk drive 20, as shown in FIGS. 3 and 4. If the disk drive 20 is to be disconnected, the press portion 124 is pressed inward to cause the protruded strip 122 to disconnect from the engagement with the hole 222. Thus, the disk drive is thus disconnected and can be quickly withdrawn vertically.

Of course it is understood that the above is merely a preferred embodiment of the invention and that various changes and alterations can be made without departing from the spirit and broader aspects thereof as set forth in the appended claims.

What is claimed is:

1. A fastening structure for a disk drive comprising:
   a pair of dovetail seat plates with dovetail ends, said dovetail seat plates respectively mounted to two lateral sides of the disk drive, a center portion of each of said dovetail seat plates being extended upward to form a resilient fastening plate, said fastening plate being provided with a protruded strip on an external surface thereof; and
   a disk drive securing support having two lateral sides thereof for the mounting of the disk drive, an inner wall of each of said lateral sides being provided with a dovetail groove corresponding to said dovetail ends of said dovetail seat plates each of said lateral sides further provided with a hole corresponding to said protruded strip.

2. The fastening structure as claimed in claim 1, wherein said fastening plate is substantially inverted L-shaped having an extended press portion.

3. The fastening structure as claimed in claim 1, wherein said protruded strip has a slanting face at a bottom edge thereof.

4. The fastening structure as claimed in claim 1, wherein each of said dovetail seat plates has two ends, each end with an inverted angle at a bottom edge thereof.

* * * * *